United States Patent [19]

Cobbledick

[11] Patent Number: 4,515,710

[45] Date of Patent: May 7, 1985

[54] IN-MOLD COATING COMPOSITION

[75] Inventor: David S. Cobbledick, Kent, Ohio

[73] Assignee: GenCorp Inc., Akron, Ohio

[21] Appl. No.: 597,149

[22] Filed: Apr. 5, 1984

Related U.S. Application Data

[60] Continuation-in-part of Ser. No. 514,415, Jul. 18, 1983, which is a division of Ser. No. 435,026, Oct. 25, 1982, Pat. No. 4,414,173, which is a continuation-in-part of Ser. No. 316,572, Nov. 2, 1981, abandoned.

[51] Int. Cl.$^3$ .............................................. H01B 1/06
[52] U.S. Cl. .................................................. 252/511
[58] Field of Search ........................................ 252/511

*Primary Examiner*—Josephine L. Barr

[57] ABSTRACT

An FRP molding can be in-mold coated using a free radical peroxide initiated thermosetting composition of at least one polymerizable epoxy based oligomer having at least two acrylate groups, at least one copolymerizable ethylenically unsaturated monomer, at least one copolymerizable monoethylenically unsaturated compound having a —CO— group and a —NH$_2$, —NH— and/or —OH group, carboxylated polyvinyl acetate, at least one zinc salt of a fatty acid, at least one calcium salt of a fatty acid, at least one copolymerizable tri or tetra acrylate, at least one accelerator for a peroxide initiator, conductive carbon black, a filler such as talc and at least one polyoxyalkylene glycol oligomer having two acrylate groups.

10 Claims, No Drawings

IN-MOLD COATING COMPOSITION

This application is a continuation-in-part of prior copending U.S. patent application Ser. No. 514,415 filed July 18, 1983 which is a division of U.S. patent application Ser. No. 435,026 filed Oct. 25, 1982 now U.S. No. 4,414,173 granted Nov. 8, 1983 which was a continuation-in-part of U.S. patent application Ser. No. 316,592 filed Nov. 2, 1981, abandoned.

This invention relates to a thermosetting in-mold coating composition useful for in-mold coating a molded fiberglass reinforced thermoset plastic such as a polyester resin or a vinyl ester resin (FRP) molding or part that usually does not require the combining of two or more components immediately prior to use.

BACKGROUND OF THE INVENTION

A major deficiency of compression molded thermoset glass fiber reinforced polyester (FRP) moldings is surface imperfections such as pits, pores, surface cracks, waviness and sink marks. The in-mold coating process of U.S. Pat. No. 4,081,578 generally overcomes these imperfections by molding a low viscosity thermoset on top of the FRP in a second molding operation. The composition described in U.S. Pat. No. 4,081,578 contains free hydroxyl as well as isocyanate groups that co-react at room temperature, resulting in a limited (about one-half hour) pot life. In practice, the reactive ingredients are kept apart, and combined only immediately prior to application. This necessitates dual pumping equipment and an accurate metering device, which increase the cost and complexity of the system. A single component coating would thus offer a significant advantage. Moreover, conductive carbon black does not dispense well in isocyanate based in-mold coating compositions, and it is difficult to obtain after in-mold coating and subsequent electrostatic painting, a paint layer which is even.

Therefore, it is an object of this invention to avoid the difficulties alluded to and to provide a process for in-mold coating an FRP molding with a one-component coating composition.

Another object of this invention is to provide a composition suitable for in-mold coating an FRP molding.

A further object of this invention is to provide a cured molded FRP molding or part with an adherent coating in-mold coated with a one component in-mold coating composition.

These and other objects and advantages of the present invention will become more apparent to those skilled in the art from the following detailed description and working examples.

SUMMARY OF THE INVENTION

According to the present invention a FRP molding can be in-mold coated using a one-component free radical initiated thermosetting composition of
(a) 100 parts by weight of at least one polymerizable epoxy based oligomer having at least two acrylate groups and a weight average molecular weight of from about 500 to 1,500,
(b) from about 80 to 160 parts by weight of at least one copolymerizable ethylenically unsaturated monomer,
(c) from about 10 to 120 parts by weight of at least one copolymerizable monoethylenically unsaturated compound having a —CO— group and a —NH$_2$, —NH— and/or —OH group,
(d) from about 20 to 90 parts by weight of carboxylated polyvinyl acetate having an acid number of from about 1.5 to 4,
(e) from about 0.2 to 5 parts by weight of at least one zinc salt of a fatty acid having at least 10 carbon atoms,
(f) from about 0.01 to 1.0 part by weight of at least one accelerator for a peroxide initiator,
(g) from about 5 to 30 parts by weight of conductive carbon black,
(h) from about 50 to 155 parts by weight of a filler,
(i) a copolymerizable or cocurable diacrylate compound having a weight average molecular weight of from about 250 to 5,000 and being at least one polyoxyalkylene glycol based oligomer having two acrylate groups,
(j) at least one copolymerizable tri or tetra acrylate having an average molecular weight of from about 250 to 1,000,
the total of (i) and (j) being from about 5 to 120 parts by weight and the weight ratio of (i) to (j) being from about 10:1 to 1:10 and
(k) at least one calcium salt of a fatty acid having at least 10 carbon atoms in an amount of from about 0.2 to 5 parts by weight.

An organic free radical peroxide initiator is used in the composition in an amount of up to about 5%, preferably up to 2%, by weight based on the weight of the polymerizable ethylenically unsaturated materials.

The composition flows well and is stable for about a week even when containing the peroxide. It can be molded in a short period of time. The resulting thermoset coating exhibits good adhesion to different FRP substrates and will accept many paint finishes obviating the need for a primer.

Also, the carbon black disperses well throughout the composition to provide on curing an in-mold coating which can be spray painted electrostatically to provide an even paint coating or film. The present coating, moreover, thus generally eliminates any subsequent step of priming the in-mold coating with a conductive primer before electrostatic painting.

The present in-mold coating composition gives improved hardness and resistance to solvents as compared to that shown in U.S. Pat. No. 4,414,173 mentioned supra.

DISCUSSION OF DETAILS AND PREFERRED EMBODIMENTS (a) The polymerizable epoxy based oligomer having at least two acrylate (or methacrylate or ethacrylate) groups is prepared by reacting acrylic acid, methacrylic acid or ethacrylic acid and so forth with an epoxy based oligomer or resin such as a Bisphenol A epoxy, a tetrabromo Bisphenol A epoxy, phenolic novolak epoxy, tetraphenylolethane epoxy, dicycloaliphatic epoxy and so forth. Mixtures of these epoxy based oligomers may be used. Of these materials it is preferred to use a diacrylate terminated Bisphenol A epoxy oligomer. They have weight average molecular weights of from about 500 to 1,500. These materials are well known. For more information on these materials see "Heat Resistant Vinyl Ester Resin," M. B. Launikitis, Technical Bulletin, SC:116–76, Shell Chemical Company, June, 1976 and Shell Chemical Company Technical Bulletins SC:16–76 and SC:60–78.

(b) A copolymerizable ethylenically unsaturated monomer is used to copolymerize with and to crosslink the polymerizable oligomers and includes styrene (preferred), alpha methyl styrene, vinyl toluene, t-butyl styrene, chlorostyrene, methyl methacrylate, diallyl phthalate (with styrene or methyl methacrylate and the like), triallyl cyanurate, triallyl isocyanurate, divinyl benzene, methyl acrylate and so forth and mixtures thereof. The unsaturated monomer is used in an amount of from about 80 to 160 parts by weight per 100 parts by weight of the polymerizable epoxy based oligomer.

(c) For further copolymerization and crosslinking and to improve hardness of the resulting coating there is used in the in-mold coating composition a monoethylenically unsaturated compound having a

group and having a —NH$_2$, —NH— and/or —OH group. Examples of such monomeric compounds are hydroxyl propyl methacrylate (preferred), hydroxyethyl methacrylate, hydroxy ethyl acrylate, hydroxy ethyl crotonate, hydroxypropyl acrylate, hydroxy polyoxypropylene acrylate, hydroxy polyoxypropylene methacrylate, hydroxy polyoxyethylene methacrylate, acrylamide, methacrylamide, N-hydroxymethyl acrylamide, N-hydroxymethyl methacrylamide and so forth and mixtures of the same. These compounds are used in an amount of from about 10 to 120 parts by weight per 100 parts by weight of the polymerizable epoxy based oligomer.

(d) Carboxylated polyvinyl acetate is employed in the in-mold composition to improve paint adhesion and hardness of the in-mold coating to the substrate. The carboxylated polyvinyl acetate has an acid number of from about 1.5 to 4. The carboxylated polyvinyl acetate is employed in an amount of from about 20 to 90 parts by weight per 100 parts by weight of the epoxy based polymerizable oligomer.

(e) A zinc salt of a fatty acid having at least 10 carbon atoms, also, is employed in the in-mold coating composition and appears to function as a mold release agent and as a secondary accelerator for the cure. Fatty acids are well known. See "Organic Chemistry," Fieser and Fieser, D. C. Heath and Company, Boston, 1944, pages 88, 381–390, 398 and 401 and "Hackh's Chemical Dictionary," Grant, McGraw Hill Book Company, New York, 1969, page 261. Mixtures of zinc salts of the fatty acids can be used. Examples of some zinc salts are zinc palmitate, zinc stearate, zinc ricinoleate and the like. It is preferred to use the zinc salt of a saturated fatty acid such as zinc stearate. See, also, "Whittington's Dictionary Of Plastics," Whittington, Technomic Publishing Co., Inc., Stamford, Conn., 1968, pages 35, 102 and 261. The zinc salt is used in an amount from about 0.2 to 5 parts by weight per 100 parts by weight of the polymerizable epoxy based oligomer.

(f) An accelerator is used for the peroxide initiator and is a material such as a drier, e.g., cobalt octoate (preferred). Other materials which may be used are zinc naphthenate, lead naphthenate, cobalt naphthenate and manganese naphthenate. Soluble Co, Mn and Pb salts of linoleic acid, also, may be used. Mixtures of accelerators may be used. The accelerator is used in an amount of from about 0.01 to 1 part by weight per 100 parts by weight of the polymerizable epoxy based oligomer.

(g) Conductive carbon black is used in the in-mold coating composition in an amount of from about 5 to 30 parts by weight per 100 parts by weight of the polymerizable epoxy based oligomer.

(h) A filler is used in the in-mold coating composition in an amount of from about 50 to 155 parts by weight per 100 parts by weight of the polymerizable epoxy based oligomer. Examples of fillers are clay, MgO, Mg(OH)$_2$, CaCO$_3$, silica, calcium silicate, mica, aluminum hydroxide, barium sulfate, talc, hydrated silica, magnesium carbonate and mixtures of the same. The fillers should be finely divided. Of these fillers it is preferred to use talc. Fillers can afford the desired viscosity and flow to the in-mold composition for molding and contribute to the desired physical properties in the resulting thermoset in-mold coating. Fillers, also, may improve adhesion. However, care should be exercised in the use of high filler contents as this may give high viscosities and result in flow and handling difficulties.

(i) There further is employed in the in-mold coating composition a copolymerizable or cocurable diacrylate compound having a weight average molecular weight of from about 250 to 5,000 and being at least one polyoxyalkylene glycol based oligomer having two acrylate groups. Examples of said diacrylate compounds include triethylene glycol diacrylate, tetraethylene glycol diacrylate, tetraethylene glycol dimethacrylate, polyethylene glycol diacrylate, polypropylene glycol diacrylate, polyethylene glycol dimethacrylate or polyoxyethylene glycol dimethacrylate (preferred), polypropylene glycol dimethacrylate, polyethylene propylene glycol diacrylate, and so forth and mixtures thereof. These acrylates are made by reacting polyoxyalkylene glycols such as polypropylene ether glycol with acrylic acid, methacrylic acid and the like or by ester interchange.

(j) There, also, is employed in the in-mold composition to improve hardness without adversely affecting paint adhesion a copolymerizable tri or tetra acrylate such as the reaction product of acrylic and/or methacrylic acids with triols or tetrols like glycerol, trimethylol propane, hexane triol pentaerythritol and the like. These materials, also, may be obtained by ester interchange, for example, by reaction of ethyl acrylate and the polyols. Other polyols may be used like the ethylene oxide and/or propylene oxide adducts of these polyols such as 1,2,3-tri (2-hydroxy-propoxy) propane ("CP-260," mw of about 260, Dow Chemical Co.), "Pluracol" PEP 650 (propylene oxide adduct of pentaerythritol, equivalent weight of about 148.1 BASF Wyandotte), "Pluracol" TP 340 (propylene oxide adduct of trimethylol propane, equivalent weight of about 101.1, BASF Wyandotte) and so forth and mixtures thereof. Examples of some of these acrylates are trimethylolpropane triacrylate, pentaerythritol triacrylate, pentaerythritol tetraacrylate, trimethylol propane trimethacrylate (preferred) and so forth. Mixtures of these tri and tetra acrylates can be used. These acrylates have average molecular weights of from about 250 to 1,000.

The total of (i) and (j) is from about 5 to 120 parts by weight per 100 parts by weight of the polymerizable epoxy based oligomer and the weight ratio of (i) to (j) is from about 10:1 to 1:10.

Since some of these reactive polyacrylates may be made by reacting unsaturated acids and alcohols, they may contain some OH and/or COOH groups.

The acrylate compound above, appear to improve the hardness of and reduce the brittleness of the in-mold coating.

(k) A calcium salt of a fatty acid having at least 10 carbon atoms in an amount of from about 0.2 to 5 parts by weight of calcium salt per 100 parts by weight of the polymerizable epoxy based oligomer is used in the in-mold coating composition as a mold release agent and to control the rate of the cure. Fatty acids are well known, see above. Mixtures of calcium salts of the fatty acids can be used. Examples of some calcium salts are calcium stearate, calcium palmitate, calcium oleate and the like. It is preferred to use the calcium salt of a saturated fatty acid like calcium stearate.

An organic free-radical or free radical generating initiator (catalyst) such as a peroxide is used to catalyze the polymerization, copolymerization and/or crosslinking of the ethylenically unsaturated oligomers and the other ethylenically unsaturated materials. Examples of free-radical initiators include tertiary butyl perbenzoate, tertiary butyl peroctoate in diallyl phthalate, diacetyl peroxide in dimethyl phthalate, dibenzoyl peroxide, di(p-chlorobenzoyl) peroxide in dibutyl phthalate, di(2,4-dichlorobenzoyl) peroxide with dibutyl phthalate, dilauroyl peroxide, methyl ethyl ketone peroxide, cyclohexanone peroxide in dibutyl phthalate, 3,5-dihydroxy-3,4-dimethyl-1,2-dioxacyclopentane, t-butylperoxy(2-ethyl hexanoate), caprylyl peroxide, 2,5-dimethyl-2,5-di(benzoyl peroxy) hexane, 1-hydroxy cyclohexyl hydroperoxide-1, t-butyl peroxy (2-ethyl butyrate), 2,5-dimethyl-2,5-bis(t-butyl peroxy) hexane, cumyl hydroperoxide, diacetyl peroxide, t-butyl hydroperoxide, ditertiary butyl peroxide, 3,5-dihydroxy-3,5-dimethyl-1,2-oxacyclopentane, and 1,1-bis(t-butyl peroxy)-3,3,5-trimethyl cyclohexane and the like and mixtures thereof. It is desirable sometimes to use mixtures of initiators to take advantage of their different decomposition rates and times at different temperatures and so forth. A preferred initiator to use is tertiary butyl perbenzoate. The peroxide initiator should be used in an amount sufficient to overcome the effect of the inhibitor and to cause crosslinking or curing of the ethylenically unsaturated materials. In general the peroxide initiator is used in an amount of up to about 5%, preferably up to about 2%, by weight based on the weight of the ethylenically unsaturaed materials employed in the in-mold coating composition.

The unsaturated materials mentioned above, thus, are used in an amount sufficient to provide on cure (e.g., polymerization, copolymerization and/or crosslinking) a thermoset composition.

To prevent premature gelation of the ethylenically unsaturated materials and to provide for improved shelf-life or storageability inhibitors are added in the desired amount to the composition or are provided in the raw materials before use. Examples of inhibitors are hydroquinone, benzoquinone, p-t-butyl catechol and the like and mixture thereof.

The in-mold composition additionally optionally may be compounded with other mold release agents, antidegradants, U-V absorbers, paraffin wax, solid glass or resin micro-spheres, thickening agents, low shrink additives and the like. These compounding ingredients should be used in amounts sufficient to provide satisfactory results. It is not desirable to use in the in-mold composition of this invention materials like butadiene-styrene block copolymers or fatty alcohol phosphates.

For ease in handling, materials like carboxylated polyvinylacetate may be dissolved in a reactive monomer like styrene. The viscosity of the oligomers may be reduced by dilution with styrene and the like. The ingredients of the in-mold composition should be readily mixed and handled at ambient or room temperature or temperatures below the polymerization temperature so that they may be readily pumped to the mold and injected into the same. The ingredients may be warmed or heated before or during mixing and mixed in steps to facilitate thorough mixing, dispersion and solution of the same. Also, the bulk of the ingredients can be thoroughly mixed and the remainder including the catalyst separately mixed and then both can be pumped to a mixing head to be mixed together and then injected into the mold.

With the peroxide initiator or catalyst the in-mold composition exhibits a shelf-life at room temperature (about 25° C.) of about a week, and without the initiator it exhibits a shelf life of several months at room temperature. The initiator is preferably added to the composition and thoroughly mixed therewith just before molding.

All of the ingredients of the in-mold coating composition should be kept dry or have a minimal amount of moisture or the water content should be controlled to obtain reproducible results and to prevent pore formation.

Mixing of the ingredients of the in-mold composition should be thorough. Injection or compression, transfer molding, or other molding apparatus or machines can be used for the in-mold coating. Molding apparatus and methods may be found in U.S. Pat. Nos. 4,076,780; 4,076,788; 4,081,578; 4,082,486; 4,189,517; 4,222,929; 4,245,006; 4,239,796; 4,239,808 and 4,331,735. Please see, also, "Proceedings of the Thirty-Second Annual Conference Reinforced Plastics/Composites Institute," SPI, Washington, February, 1977, Griffith et al., Section 2-C, pages 1–3 and "33rd Annual Technical Conference, 1978 Reinforced Plastics/Composites Institute The Society of the Plastics Industry, Inc.," SPI, Ongena, Section 14-B, pages 1–7. The in-mold coating composition can be applied to the substrate and cured at a temperature of from about 290° to 310° F. and at a pressure of about 1000 p.s.i. for from about 0.5 to 3 minutes.

The processes and products of the present invention can be used in the manufacture of automobile parts such as grille and headlamp assemblies, deck hoods, fenders, door panels and roofs as well as in the manufacture of food trays, appliance and electrical components, furniture, machine covers and guards, bathroom components, structural panels and so forth. The glass fiber reinforced thermoset plastic (FRP) such as the polyester resin or vinyl ester resin and glass fiber composition substrate to which the in-mold composition is applied can be a sheet molding compound (SMC) or a bulk molding compound (BMC), or other thermosetting FRP material as well as a high strength molding compound (HMC) or a thick molding compound. The FRP substrate can have from about 10 to 75% by weight of glass fibers. The SMC compound usually contains from about 25 to 30% by weight of glass fibers while the HMC compound may contain from about 55 to 60% by weight of glass fibers. The glass fiber reinforced thermoset plastic (FRP) substrate can be rigid or semirigid (may contain a flexibilizing moiety such as an adipate group in the polyester). The substrate, also, may contain other flexibilizing polymers, the elastomers and plastomers, such as the styrene-butadiene block copolymers. Unsaturated polyester glass fiber thermosets are known as shown by "Modern Plastics Encyclopedia," 1975–1976, October, 1975, Vol. 52, No. 10A, McGraw-Hill, Inc., New York, pages 61, 62 and 105 to 107;

"Modern Plastics Encyclopedia," 1979–1980, October, 1979, Volume 56, Number 10A, pages 55, 56, 58, 147 and 148 and "Modern Plastics Encyclopedia," 1980–81, October, 1980, Volume 57, Number 10A, pages 59, 60, and 151 to 153, McGraw-Hill, Inc., New York, N.Y. For information on vinyl ester resins see the Shell Chemical Company Technical Bulletins mentioned above.

The compositions of the present invention can exhibit good pumpability and flow in the mold. They can give rapid cures as low as 50 to 90 seconds at 300° F. They, also, show good adhesion to paints and can be used not only as an in-mold coating to cover blemishes but as a good conductive coating for electrostatic painting and as a primer for most paint finish systems such as soluble acrylic lacquers, acrylic dispersion lacquers, water borne acrylic enamels, high solids solution acrylic enamels, acrylic non-aqueous dispersions and urethanes.

The following example will serve to illustrate the present invention with more particularity to those skilled in the art. In the example, the parts are parts by weight unless otherwise indicated.

EXAMPLE

| In-Mold Coating Composition | |
|---|---|
| Material | Parts By Weight |
| LP-40A | 75.0 |
| Styrene | 32.0 |
| Hydroxypropylmethacrylate | 30.0 |
| Trimethylolpropane trimethacrylate | 12.0 |
| Polyoxyethylene glycol 600 dimethacrylate, molecular weight of about 770, $C_{36}H_{66}O_{17}$ | 3.0 |
| 2% benzoquinone in styrene | 8.0 |
| A. All of the above were mixed well | |
| Zinc stearate | 0.90 |
| Calcium stearate | 1.35 |
| Cobalt octoate (12% as Co in mineral oil) | 0.12 |
| B. The Zn, Ca and Co materials were added to A. and mixed well | |
| Cargill Resin 1570 (non-volatile diacrylate ester of a liquid Bisphenol A epoxy resin, Cargill Corp.) | 85.0 |
| C. Added 1570 to A. and B. and mixed well | |
| D. Blended with A. B. and C were | |
| VULCAN XC-72R (N472, Conductive furnace carbon black, Cabot Corp.) and | 10 |
| MISTRON RSC Talc (Hydrous magnesium silicate, Cyprus Industrial Minerals Corp.) | 80 |

Brookfield Viscosity of the in-mold coating composition at 86° F., #7 spindle @ 100 r.p.m., was 14,800 cps.

Gel times on total in-mold composition at 230° F., minutes/peak temp. °F.:
 1 part TBPB/100 parts in-mold coating composition 13.1/374° F.
 1.5 parts TBPB/100 parts in-mold coating composition 8.3/358° F. TBPB (Tertiary butyl perbenzoate)

LP-40A-BAKELITE LP-40A-40% by weight carboxylated polyvinyl acetate, acid No. 2.3–2.7, in styrene, viscosity of 5,000 centiposes at 25° C., specific gravity at 25/25° C. of 0.997, solidification temperature of −30° C., storage stability of >30 days at 120° F., Union Carbide Corp.

When the in-mold composition was cured on an SMC (FRP) substrate in a mold for 60 seconds at 300° F. and 1000 psi, the following properties were obtained on testing the coating (1.5 mil thickness):

| | |
|---|---|
| Hardness pencil* at ca 75° F. | F to H |
| Hardness pencil* at 290–300° F. | 3B |
| Solvent Resistance (rub test, to rub off coating) | |
| methyl ethyl ketone | good |
| methylene chloride | good |
| Ransberg meter reading (top of scale) | 165+ |

In comparison a similar in-mold coating composition in which polyvinyl acetate was used in place of the carboxylated polyvinyl acetate and in which all of the trimethylol propane trimethacrylate was replaced with an equal amount of polyoxyethylene glycol 600 dimethacrylate gave after in-mold coating on an SMC (FRP) substrate the following results:

| | |
|---|---|
| Hardness pencil* at ca 75° F. | F |
| Hardness pencil* at 290–300° F. | 6B |
| Solvent resistance (rub test) | |
| methyl ethyl ketone | Fair |
| methylene chloride | Poor |
| Ransberg meter reading (conductivity) | 165+ |

*ASTM D3363-74 (Reapproved 1980)
6B–5B–4B–3B–2B–B–HB–F–H–2H–3H–4H–5H–6H
Softer                                    Harder

I claim:
1. A composition useful as a thermosetting coating composition comprising
 (a) 100 parts by weight of at least one polymerizable epoxy based oligomer having at least two acrylate groups and a weight average molecular weight of from about 500 to 1,500,
 (b) from about 80 to 160 parts by weight of at least one copolymerizable ethylenically unsaturated monomer,
 (c) from about 10 to 120 parts by weight of at least one copolymerizable monoethylenically unsaturated compound having —CO— group and a —NH$_2$, —NH— and/or —OH group,
 (d) from about 20 to 90 parts by weight of carboxylated polyvinyl acetate having an acid number of from about 1.5 to 4,
 (e) from about 0.2 to 5 parts by weight of at least one zinc salt of a fatty acid having at least 10 carbon atoms,
 (f) from about 0.01 to 1.0 part by weight of at least one accelerator for a peroxide initiator,
 (g) from about 5 to 30 parts by weight of conductive carbon black,
 (h) from about 50 to 155 parts by weight of a filler,
 (i) a copolymerizable or cocurable diacrylate compound having a weight average molecular weight of from about 250 to 5,000 and being at least one polyoxyalkylene glycol oligomer having two acrylate groups and
 (j) at least one copolymerizable tri or tetra acrylate having an average molecular weight of from about 250 to 1,000,
 the total of (i) and (j) being from about 5 to 120 parts by weight and the weight ratio of (i) to (j) being from about 10:1 to 1:10 and
 (k) at least one calcium salt of a fatty acid having at least 10 carbon atoms in an amount of from about 0.2 to 5 parts by weight.

2. A composition according to claim 1 containing additionally at least one organic free radical peroxide initiator in an amount of up to about 5% by weight based on the weight of the polymerizable ethylenically unsaturated materials.

3. A composition according to claim 1 where (h) comprises talc.

4. A composition according to claim 1 where
   (a) is a diacrylate ester of a liquid Bisphenol A epoxy resin,
   (b) is styrene,
   (c) is hydroxypropyl methacrylate,
   (e) is zinc stearate,
   (f) is cobalt octoate,
   (h) is talc,
   (i) is polyoxyethylene glycol dimethacrylate having a molecular weight of about 770,
   (j) is trimethylol propane trimethacrylate and
   (k) is calcium stearate.

5. A method which comprises in-mold coating a molded thermoset polyester resin or thermoset vinyl ester resin glass fiber composition containing from about 10 to 75% by weight of glass fibers with a thermosetting in-mold coating composition under pressure, at a temperature and for a period of time sufficient to cure said in-mold coating composition to form an adherent thermoset coating on said molded thermoset resin glass fiber composition, said in-mold coating composition comprising
   (a) 100 parts by weight of at least one polymerizable epoxy based oligomer having at least two acrylate groups and a weight average molecular weight of from about 500 to 1,500,
   (b) from about 80 to 160 parts by weight of at least one copolymerizable ethylenically unsaturated monomer,
   (c) from about 10 to 120 parts by weight of at least one copolymerizable monoethylenically unsaturated compound having a —CO— group and a —NH$_2$, —NH— and/or —OH group,
   (d) from about 20 to 90 parts by weight of carboxylated polyvinyl acetate having an acid number of from about 1.5 to 4,
   (e) from about 0.2 to 5 parts by weight of at least one zinc salt of a fatty acid having at least 10 carbon atoms,
   (f) from about 0.01 to 1.0 part by weight of at least one accelerator for a peroxide initiator,
   (g) from about 5 to 30 parts by weight of conductive carbon black,
   (h) from about 50 to 155 parts by weight of a filler,
   (i) a copolymerizable or cocurable diacrylate compound having a weight average molecular weight of from about 250 to 5,000 and being at least one polyoxyalkylene glycol oligomer having two acrylate groups,
   (j) at least one copolymerizable tri or tetra acrylate having an average molecular weight of from about 250 to 1,000, the total of (i) and (j) being from about 5 to 120 parts by weight and the weight ratio of (i) to (j) being from about 10:1 to 1:10,
   (k) at least one calcium salt of a fatty acid having at least 10 carbon atoms in an amount of from about 0.2 to 5 parts by weight and
at least one organic free radical peroxide initiator in an amount of up to about 5% by weight based on the weight of the polymerizable ethylenically unsaturated materials.

6. A method according to claim 5 where (h) comprises talc.

7. A method according to claim 5 where
   (a) is a diacrylate ester of a liquid Bisphenol A epoxy resin,
   (b) is styrene,
   (c) is hydroxypropyl methacrylate,
   (e) is zinc stearate,
   (f) is cobalt octoate,
   (h) is talc,
   (i) is polyoxyethylene glycol dimethacrylate having a molecular weight of about 770,
   (j) is trimethylol propane trimethacrylate,
   (k) is calcium stearate and
said initiator is tertiary butyl perbenzoate.

8. A laminate comprising an adherent, thermoset in-mold coating composition in-mold coated onto a molded thermoset polyester resin or thermoset vinyl ester resin glass fiber composition containing from about 10 to 75% by weight of glass fibers, said in-mold coating composition comprising the reaction product of 100 parts by weight of at least one polymerizable epoxy based oligomer having at least two acrylate groups and a weight average molecular weight of from about 500 to 1,500, from about 80 to 160 parts by weight of at least one copolymerizable ethylenically unsaturated monomer, from about 10 to 120 parts by weight of at least one copolymerizable monoethylenically unsaturated compound having a —CO— group and a —NH$_2$, —NH— and/or —OH group, (I) a copolymerizable or cocurable diacrylate compound having a weight average molecular weight of from about 250 to 5,000 and being at least one polyoxyalkylene glycol oligomer having two acrylate groups, (II) at least one copolymerizable tri or tetra acrylate having an average molecular weight of from about 250 to 1,000, the total of (I) and (II) being from about 5 to 120 parts by weight and the weight ratio of (I) to (II) being from about 10:1 to 1:10, in admixture with from about 20 to 90 parts by weight of carboxylated polyvinyl acetate having an acid number of from about 1.5 to 4, from about 0.2 to 5 parts by weight of at least one zinc salt of a fatty acid having at least 10 carbon atoms, at least one calcium salt of a fatty acid having at least 10 carbon atoms in an amount of from about 0.2 to 5 parts by weight, from about 5 to 30 parts by weight of conductive carbon black and from about 50 to 155 parts by weight of a filler.

9. A laminate according to claim 8 in which in said in-mold coating composition said filler comprises talc.

10. A laminate according to claim 8 in which in said in-mold coating composition
   said epoxy based oligomer is a diacrylate ester of a liquid Bisphenol A epoxy resin,
   said ethylenically unsaturated monomer is styrene,
   said monoethylenically unsaturated compound is hydroxy propyl methacrylate,
   said (I) copolymerizable or cocurable diacrylate compound is polyoxyethylene glycol dimethacrylate having a molecular weight of about 770, said (II) tri or tetra acrylate is trimethylol propane trimethacrylate, said filler comprises talc, said zinc salt is zinc stearate and said calcium salt is calcium stearate.

* * * * *

UNITED STATES PATENT AND TRADEMARK OFFICE
CERTIFICATE OF CORRECTION

PATENT NO. : 4,515,710
DATED : May 7, 1985
INVENTOR(S) : David S. Cobbledick

It is certified that error appears in the above-identified patent and that said Letters Patent are hereby corrected as shown below:

Column 8, line 41, after "having" insert ---a---.

Signed and Sealed this

Twenty-fourth Day of September 1985

[SEAL]

Attest:

DONALD J. QUIGG

Attesting Officer

Commissioner of Patents and
Trademarks—Designate